United States Patent
Tuckey et al.

[11] Patent Number: 5,842,455
[45] Date of Patent: Dec. 1, 1998

[54] FUEL ACCUMULATOR AND PRESSURE LIMITING DEVICE

[75] Inventors: Charles H. Tuckey, Sand Point; Ronald B. Kuenzli, Deford, both of Mich.

[73] Assignee: Walbro Corporation, Cass City, Mich.

[21] Appl. No.: 46,999

[22] Filed: Mar. 24, 1998

[51] Int. Cl.⁶ .................. F02M 39/00; F16K 17/04
[52] U.S. Cl. .................. 123/514; 123/509; 123/447; 137/115.27
[58] Field of Search .................. 123/514, 506, 123/447, 509, 497; 137/115.13, 115.27

[56] References Cited

U.S. PATENT DOCUMENTS

| | | | |
|---|---|---|---|
| 4,458,712 | 7/1984 | Stevenson | 137/115.13 |
| 4,957,084 | 9/1990 | Kramer | 123/447 |
| 5,078,167 | 1/1992 | Brandt | 137/115.27 |
| 5,402,817 | 4/1995 | Bueser | 137/115.13 |
| 5,408,970 | 4/1995 | Burkhard | 123/447 |
| 5,435,344 | 7/1995 | Robinson | 123/514 |
| 5,590,631 | 1/1997 | Tuckey | 123/447 |
| 5,655,504 | 8/1997 | Iwai | 123/514 |
| 5,706,785 | 1/1998 | Radermacher | 137/115.13 |
| 5,720,263 | 2/1998 | Frank | 123/514 |
| 5,727,529 | 3/1998 | Tuckey | 123/514 |
| 5,762,047 | 6/1998 | Yoshioka | 123/514 |

*Primary Examiner*—Carl S. Miller
*Attorney, Agent, or Firm*—Barnes, Kisselle, Raisch, Choate, Whittemore & Hulbert, P.C.

[57] ABSTRACT

An accumulator and over-pressure relief valve unit disposed within a vehicle fuel tank to accommodate expansion of fuel due to heating of the fuel within the fuel system and to maintain increased pressure of heated fuel in the fuel system to prevent vapor formation and to provide an over-pressure relief to bleed fuel back into the fuel tank when the unit has reached its maximum fuel accumulating capacity. The accumulator has a plastic cap press fit onto a plastic body with a diaphragm received therebetween and defining an expansion chamber with the body. To provide a seal between the cap and body, they are preferably ultrasonically welded together. The diaphragm has a normally closed valve which, when opened, communicates the accumulator chamber with the fuel tank. This valve opens in response to any overpressure that may develop after the accumulator has reached its maximum accumulating capacity to bypass fuel into the fuel tank and thereby limit the maximum pressure of the fuel in the fuel system.

12 Claims, 2 Drawing Sheets

5,842,455

FUEL ACCUMULATOR AND PRESSURE LIMITING DEVICE

FIELD OF THE INVENTION

This invention relates generally to automotive fuel systems and more particularly to an accumulator with over pressure relief to accommodate expansion of fuel and to limit the maximum pressure of fuel in the fuel system.

BACKGROUND OF THE INVENTION

In automotive fuel systems the temperature of the fuel downstream of the fuel tank can become heated due to the high temperature of the operating engine and the adjacent components such as the fuel rail. The high temperature of the fuel rail and engine causes the fuel adjacent thereto to be heated and expand which increases the pressure of fuel in the fuel rail and within the fuel system as a whole. To control the pressure of fuel delivered to the engine, fuel pressure regulators are typically disposed within the fuel system and may be of the no-return or return type pressure regulators. Typical return type fuel pressure regulators are disposed downstream of the vehicle fuel tank and fuel delivered to the regulator in excess of the engine's fuel demand is returned by the regulator to the fuel tank through a return fuel line. In no-return or "return less" fuel systems, a fuel pressure regulator is typically disposed within the fuel tank immediately downstream of the fuel pump to bypass excess fuel delivered from the fuel pump directly into the fuel tank.

Typical fuel pressure regulators used in either return type or no-return fuel systems cannot accommodate any increase in pressure caused by fuel expansion due to heat rise and do not accumulate the increased volume of the heated fuel. For example, during engine deceleration the injectors may close trapping fuel in the fuel rail which becomes heated and expands thereby increasing the pressure in the fuel rail. In this situation, it is desirable to accommodate the expansion of the heated fuel and also to control the pressure of the fuel in the fuel system.

Pressure rise and fuel expansion in the fuel rail also occurs during conditions known as hot soak. Hot soak conditions occur when the engine has been idling or running at slow speeds especially during hot weather or when the hot engine is turned off. The high temperature in the fuel rail plus the hot ambient air causes the fuel trapped in the fuel rail to be heated and expand. Although some pressure increase is desirable to prevent the fuel vapor formation, excessive pressure in the fuel rail is undesirable since it can force fuel through the fuel injectors causing leakage and/or malfunctions.

In return type fuel pressure regulators, any fuel pressure above the set system pressure is relieved by returning fuel to the tank through a fuel return line. Accordingly, these devices maintain only a set maximum system pressure. In addition, the returned fuel may have an elevated temperature which may cause unwanted vaporization.

One previous fuel accumulator and over-pressure relief device is disclosed in U.S. Pat. No. 5,590,631. This device has a relatively large overall size and a housing comprising a metal cap joined to a plastic body by rolling a peripheral edge of the cap over a radially extending flange of the body. To incorporate the accumulator into automotive fuel systems, it is desirable to have the smallest possible accumulator which will accumulate sufficient fuel. Further, it is desirable to reduce the cost to manufacture and assemble the accumulator. Thus, there is a need to provide an accumulator which is smaller in size, comprised of lower cost components and which may be more easily assembled.

SUMMARY OF THE INVENTION

An accumulator and over-pressure relief valve module disposed within a vehicle fuel tank to accommodate expansion of fuel due to heating of the fuel within the fuel system and to accommodate and maintain increased pressure of heated fuel in the fuel system to prevent vapor formation and to provide an over-pressure relief to bleed fuel back into the fuel tank when the module has reached its maximum fuel accumulating capacity. The accumulator has a plastic retainer cap press fit onto a plastic body with a diaphragm received therebetween and defining a fuel accumulation chamber with the body. To provide a seal between the cap and body, they are preferably ultrasonically welded together. The diaphragm has an opening through which fuel flow is controlled by a normally closed valve which, when opened, communicates the accumulator chamber with the fuel tank. This valve opens in response to any over-pressure that may develop after the accumulator has reached its maximum accumulating capacity to bypass fuel into the fuel tank and thereby limit the maximum pressure of the fuel in the fuel system.

The two-piece plastic housing is very small, economical to manufacture and easier to assemble than prior fuel system accumulators. Although having a small overall size, the accumulator can accommodate a significant volume of fuel before bypassing fuel to the fuel tank.

Objects, features and advantages of this invention include providing an accumulator which accommodates some expansion of fuel in the fuel system, maintains a pressure of fuel slightly higher than the desired system operating pressure when the fuel injectors are closed and the fuel expands, reduces the formation of fuel vapor in the fuel system, provides over-pressure relief to limit the maximum pressure of fuel in the fuel system, is compact, of relatively simple design and economical manufacture and assembly and has a long useful life in service.

BRIEF DESCRIPTION OF THE DRAWINGS

These and other objects, features and advantages of this invention will be apparent from the following detailed description of the preferred embodiment and best mode, appended claims and accompanying drawings in which:

DETAILED DESCRIPTION OF THE PREFERRED EMBODIMENT

Figure 1:
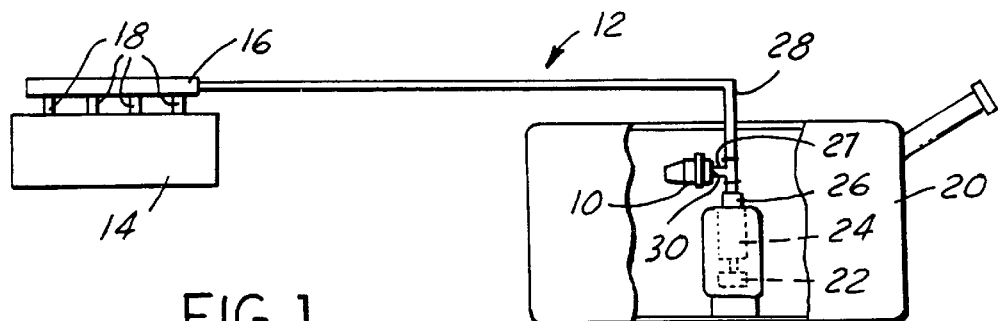
FIG. 1 is a schematic view of a fuel supply system for an internal combustion engine having an accumulator and over-pressure relief valve module embodying this invention.

Referring in more detail to the drawings, FIG. 1 illustrates an accumulator and over-pressure relief valve module 10 embodying this invention and disposed within a fuel supply system 12 for an internal combustion engine 14 having a fuel rail 16 and fuel injectors 18. A fuel tank 20 houses a fuel pump 22 driven by an electric motor 24 to pump fuel through an outlet 26 of the fuel pump 22 to a fuel supply line 28 through which fuel is delivered to the fuel rail 16.

Figure 2:
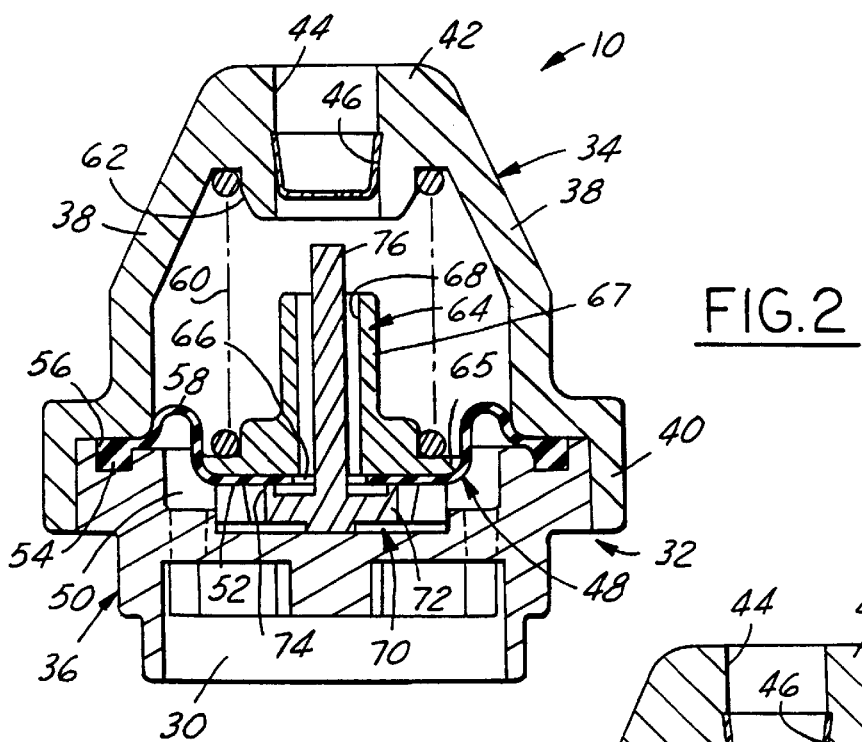
FIG. 2 is a cross sectional view of the accumulator and over-pressure relief valve module of FIG. 1.
Figure 3:
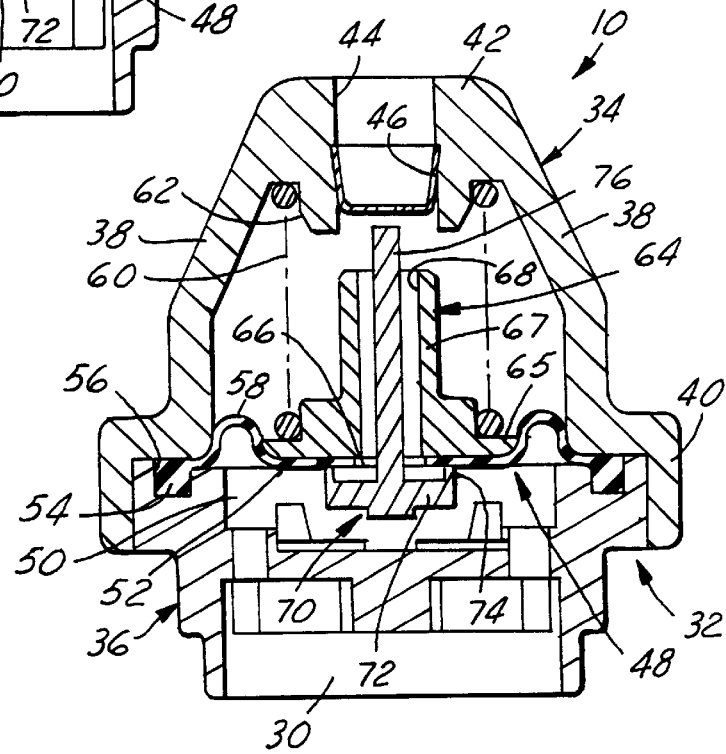
FIG. 3 is a cross sectional view of the accumulator and over-pressure relief valve module shown in an accumulating position.
Figure 4:
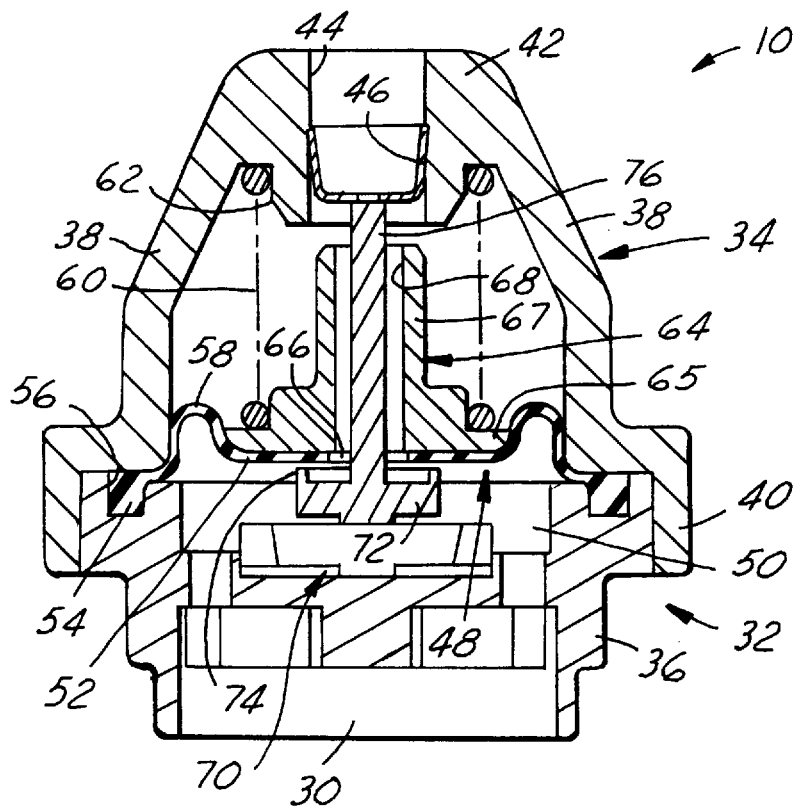
FIG. 4 is a cross sectional view of the accumulator and over-pressure relief valve module illustrating the valve in an open position permitting fuel to be bypassed to the fuel tank.
Figure 5:
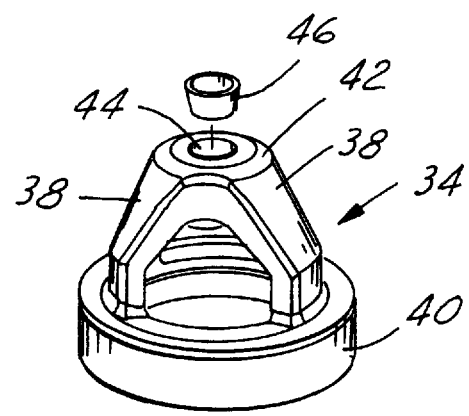
FIG. 5 is a perspective view of a cap of the module housing.

The accumulator 10 is connected through a T fitting 27 so that its inlet 30 communicates with the fuel line 28 downstream of the fuel pump 22 and within the fuel tank 20. As shown in FIGS. 2–4, the accumulator 10 has a housing 32 of a polymeric material comprising a cap 34 press fit over a body 36 and preferably ultrasonically welded thereto to provide a seal and to permanently connect the cap 34 to the body 36. The cap 34 and the body 36 are typically molded and formed of a plastic material suitable for use in hydrocarbon fuels, such as polyphenylene sulfide, nylons, acetals or other polymers. As best shown in FIG. 5, the cap 34 has two or more spokes 38 interconnecting a rim 40 received over the body 36 and a central hub 42 which has a through bore 44 in which a stop 46 is press fit. The housing 32 encloses a diaphragm 48 which defines in part a fuel accumulation chamber 50 with the body 36.

The diaphragm 48 has a relatively thin and flexible central portion 52 and a circumferentially continuous peripheral rib 54 received in a groove 56 in the body 36 and retained therein by the cap 34 to provide fluid tight seals between them and the diaphragm 48. Preferably, to permit increased displacement of the diaphragm 48 it has a circumferentially continuous annular pleat or bellows 58 sized to permit, by gathering and ungathering thereof, full working travel of the diaphragm central portion 52. The diaphragm 48 is yieldably biased towards the body 36 by a spring 60 retained at its upper end by an annular shoulder 62 of the cap 34. The lower end of the spring 60 bears on a retainer 64 disposed between the spring 60 and the diaphragm 48. The retainer 64 has a radially outwardly extending flange 65 engaged by the spring 60 and an axially extending, annular sidewall 67 defining a through bore 68 of the retainer 64. The diaphragm 48 has a central opening 66 which opens into the through bore 68 of the retainer 64 such that fuel enters the cap 34 through the diaphragm opening 66 and through the bore 68 of the retainer 64.

An over-pressure relief valve 70 is carried by the diaphragm 48 for travel therewith and is normally held in a closed position against the diaphragm 48 by the pressure of fuel in the accumulation chamber 50 to prevent fuel flow through the diaphragm opening 66. The valve 70 has a circular valve head 72 with a raised annular rim 74 which engages the diaphragm 48 and an elongate valve stem 76 extending through the retainer bore 68. The valve 70 normally seals the diaphragm opening 66 and forms part of the working surface of the diaphragm 48 and the diaphragm 48 is displaced within the cap 34 by the pressure of fuel within the accumulation chamber 50 acting on the diaphragm 48 and valve head 72. As shown in FIG. 4, displacement of the diaphragm 48 increases the volume of the accumulation chamber 50 to accommodate the expansion of fuel in the fuel system. Fuel over-pressure relief occurs only when the valve 70 is opened by engagement of the upper end of the valve stem 76 with the stop 46 received in the cap 34, as shown in FIG. 4. Engagement of the valve stem 76 with the stop 46 prevents further upward motion of the valve 70 as upward travel of the diaphragm 48 continues thereby separating the diaphragm 48 and valve 70 to permit fuel flow through the diaphragm opening 66, bore 68 of the retainer 64 and into the cap 34. Fuel then flows back into the fuel tank 20 through the openings between the spokes 38 of the cap 34. The opening of the valve 70 limits the maximum pressure of fuel in the fuel system.

In use, if the engine 14 is operating under a constant fuel flow rate to the fuel rail 16 and within a normal operating fuel pressure range, the force of the spring 60 acting on the diaphragm 48 biases the diaphragm 48 and the over-pressure relief valve 70 towards the accumulator body 36 and the valve 70 into engagement with the body (FIG. 2). Under certain conditions, such as engine deceleration or hot soak, the volume of fuel trapped in the fuel rail 16 may increase due to continued fuel pump output or it may be heated sufficiently to expand its volume. As the volume of fuel so increases, it generates an increased pressure of fuel in the accumulation chamber 50. As the pressure of fuel in the accumulation chamber 50 increases, it causes the volume of the accumulation chamber 50 to expand by displacing the diaphragm 48 against the force of the spring 60 to accumulate a limited volume of fuel in the accumulation chamber 50 (FIG. 3). Once the diaphragm 48 is displaced from its lower most position as shown in FIG. 2, the spring 60 establishes system fuel pressure, which is a function of the force produced by the spring 60 on the diaphragm and the effective working area of the diaphragm 48 and valve head 72.

The volume of the accumulation chamber 50 can continue to expand until the over-pressure relief valve 70 is opened (FIG. 4). This establishes the maximum volume of the accumulation chamber 50 and sets the maximum system pressure. The maximum volume of the accumulation chamber 50 is thus reached when the valve stem 76 abuts the stop 46 press fit in the cap 34. Further displacement of the diaphragm 48 separates the diaphragm 48 from the valve head 72 to open the valve 70 and permit fuel to flow through the diaphragm hole 66 and into the fuel tank 20 through the cap 34. As the volume of the accumulation chamber 50 decreases by such relieving of fuel, the diaphragm 48 is biased by the spring 60 to move towards the accumulation chamber 50 whereupon the diaphragm 48 engages the valve head 72 to close the valve 70 and seal the diaphragm opening 66.

Thus, the maximum pressure of the fuel in the accumulation chamber 50 and hence within the fuel line 28 and the fuel rail 16 is maintained by the force produced by the spring 60. This is advantageous because the spring force can be selected to be higher than the normal system operating pressure to keep the system fuel pressurized above its vaporization pressure and hence, in a liquid state throughout the maximum temperature range normally encountered in use. Further, the improved design of the accumulator 10 permits significant accumulation of fuel in a very small housing 32 which is formed of relatively low cost components which are easily and economically assembled.

We claim:

1. An accumulator and over-pressure relief module constructed to be disposed in a fuel tank of a fuel delivery system which delivers fuel from the fuel tank to a fuel-injected engine through a fuel line comprising:

a housing comprising a polymeric cap telescopically connected to a polymeric body and an inlet in communication with the fuel line, the cap has at least one opening therethrough communicating the interior of the cap with the fuel tank;

a flexible diaphragm carried by the housing, defining in part a fuel accumulation chamber in communication with the inlet of the housing and having an opening therethrough, the diaphragm being yieldably biased in a direction tending to reduce the volume of the fuel accumulation chamber and acted on by fuel within the fuel accumulation chamber which tends to displace the diaphragm to increase the volume of the fuel accumulation chamber;

a valve having a valve stem extending through the opening in the diaphragm and a valve head engageable with the diaphragm through at least a portion of the diaphragm's displacement to selectively communicate the fuel accumulation chamber with the opening through the diaphragm whereby the diaphragm is displaceable to increase the volume of the fuel accumulation chamber and accommodate a limited volumetric increase of the fuel in the fuel system; and a stop engageable up the valve stem after an increment of displacement of the diaphragm to disengage the valve head from the diaphragm upon further displacement of the diaphragm and thereby permit fuel in the fuel accumulation chamber to flow through the diaphragm opening to be returned to the fuel tank through the opening of the cap to limit the maximum pressure of the fuel in the fuel system.

2. The accumulator of claim 1 wherein the cap and the body are connected with an interference fit.

3. The accumulator of claim 1 wherein the cap and the body are welded together providing a liquid-tight seal between them.

4. The accumulator of claim 1 wherein the diaphragm has a peripheral edge received between the cap and the body.

5. The accumulator of claim 1 wherein the stop is carried by the cap and engageable by the valve stem to limit the movement of the valve.

6. The accumulator of claim 1 wherein the cap provides the stop engageable by the valve stem to limit the movement of the valve.

7. The accumulator of claim 1 wherein the cap comprises two or more spokes connected at one end to an annular rim which is closely received adjacent the body and at their other end to a hub.

8. The accumulator of claim 7 wherein the hub has a through bore in which is received the stop engageable by the valve stem to limit the movement of the valve.

9. The accumulator of claim 1 which comprises a coil spring received in the cap which yieldably biases the diaphragm in the direction tending to reduce the volume of the fuel accumulation chamber.

10. The accumulator of claim 9 which also comprises a retainer disposed between the spring and the diaphragm and constructed to receive and locate one end of the spring.

11. The accumulator of claim 10 wherein the retainer has a generally cylindrical, annular wall to guide the valve stem received therethrough.

12. The accumulator of claim 1 wherein the body and cap are ultrasonically welded together.

* * * * *